(12) United States Patent
Mann

(10) Patent No.: US 8,850,065 B2
(45) Date of Patent: Sep. 30, 2014

(54) DIAMETER ROUTE LEARNING

(75) Inventor: Robert A. Mann, Carp (CA)

(73) Assignee: Alcatel Lucent, Boulogne-Billancourt (FR)

( * ) Notice: Subject to any disclaimer, the term of this patent is extended or adjusted under 35 U.S.C. 154(b) by 10 days.

(21) Appl. No.: 13/343,446

(22) Filed: Jan. 4, 2012

(65) Prior Publication Data

US 2013/0173823 A1 Jul. 4, 2013

(51) Int. Cl.
*G06F 11/00* (2006.01)
(52) U.S. Cl.
CPC ..................... *G06F 11/00* (2013.01)
USPC ........................................................ 709/240
(58) Field of Classification Search
None
See application file for complete search history.

(56) References Cited

U.S. PATENT DOCUMENTS

| | | | |
|---|---|---|---|
| 7,356,031 B1 * | 4/2008 | Toebes et al. | 370/392 |
| 7,885,267 B2 * | 2/2011 | Nabae | 370/395.31 |
| 2004/0249977 A1 * | 12/2004 | Minamisawa | 709/245 |
| 2006/0088015 A1 * | 4/2006 | Kakivaya et al. | 370/338 |
| 2006/0126521 A1 * | 6/2006 | Hyndman et al. | 370/248 |
| 2007/0091821 A1 * | 4/2007 | Seo et al. | 370/254 |
| 2007/0291649 A1 * | 12/2007 | Nabae | 370/237 |
| 2010/0074147 A1 * | 3/2010 | Decasper et al. | 370/254 |
| 2010/0195613 A1 * | 8/2010 | Hu et al. | 370/329 |
| 2011/0202676 A1 * | 8/2011 | Craig et al. | 709/238 |
| 2011/0314178 A1 * | 12/2011 | Kanode et al. | 709/238 |
| 2012/0030150 A1 * | 2/2012 | McAuley et al. | 706/12 |
| 2012/0155325 A1 * | 6/2012 | Eichen et al. | 370/254 |

* cited by examiner

*Primary Examiner* — Huy D Vu
*Assistant Examiner* — Bao G Nguyen
(74) *Attorney, Agent, or Firm* — Kramer Amado P.C.

(57) ABSTRACT

Various exemplary embodiments relate to a method and related network node including one or more of the following: receiving a message at the network device; constructing a route key based on the message, wherein the route key comprises at least one value carried by the message; determining whether the network device stores a previous route record associated with the route key; and if the network device does not store a previous route record associated with the route key, generating a new route record based on the route key, and provisioning a new route based on the new route record into a routing table of the network device.

18 Claims, 4 Drawing Sheets

| | Destination Realm (405) | Application (410) | Peer Origin Host (415) | Priority (420) | Operator-Created Flag (425) | Timestamp (430) | Active Flag (435) | Description (440) |
|---|---|---|---|---|---|---|---|---|
| 450 | Realm X | 0x1A32 | Node D | 1 | N | 1320531207 | N | - |
| 455 | Realm Z | 0x1A32 | Node B | 1 | N | 1320477133 | Y | - |
| 460 | Realm Z | 0x1A32 | Node C | 3 | Y | 1320106039 | Y | Backup route |
| 465 | * | 0xE45A | Node A | 2 | N | 1320491823 | Y | A logs all messages for E45A |
| 470 | Realm W | * | Node A | 4 | Y | 1302026655 | Y | Default messages for W to A |
| 475 | ... | ... | ... | ... | ... | ... | ... | ... |

400

DIAMETER ROUTE LEARNING

TECHNICAL FIELD

Various exemplary embodiments disclosed herein relate generally to telecommunications networks.

BACKGROUND

Computer networks enable computers to communicate with each other and thereby provide many different services to end users, including web access, email, television, and telephone service. Networks are able to support such services across great distances by enabling communication not only between computers that are directly connected to one another, but also between computers that are connected to one another via one or more intermediate devices such as switches, routers, and other computers. Enablement of this communication often involves implementation of a reliable method for routing messages between computers through these intermediate devices.

Numerous protocols have been developed that include methods for determining how to route each message to its eventual destination. In many implementations of these protocols, each device may determine how to route a received message by using a routing table. This routing table may include a number of records that each define a "next hop" for a particular type of message. When such a device receives a message that is to be forwarded, the device may locate a record in the routing table that matches the message and proceed to forward the message to the "next hop" device identified by the record. This routing table may similarly be useful for computers that are located at an endpoint of a communication; when sending a message to a particular recipient, the sending computer may use a routing table to determine the "next hop" toward that recipient.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for learning routes, the method including one or more of the following: receiving a message at the network device; constructing a route key based on the message, wherein the route key includes at least one value carried by the message; determining whether the network device stores a previous route record associated with the route key; and if the network device does not store a previous route record associated with the route key, generating a new route record based on the route key, and provisioning a new route based on the new route record into a routing table of the network device.

Various exemplary embodiments relate to a network device for learning routes including one or more of the following: a network interface that receives a message; a route configuration storage that stores a plurality of route records, each route record including a route key; a routing table that defines a plurality of provisioned routes; a record manager configured to: construct a new route key based on the message wherein the new route key includes at least one value carried by the message; determine whether any route record of the plurality of route records includes the new route key, and if no route record of the plurality of route records includes the new route key; generate a new route record based on the message; and a route provisioning module configured to provision a new route to the routing table based on the new route record.

Various exemplary embodiments relate to a tangible and non-transitory machine-readable storage medium encoded with instructions for execution by a network device for learning routes, the tangible and non-transitory machine-readable storage medium including one or more of the following: instructions for receiving a message at the network device; instructions for constructing a route key based on the message, wherein the route key includes at least one value carried by the message; instructions for determining whether the network device stores a previous route record associated with the route key; and instructions for, if the network device does not store a previous route record associated with the route key, generating a new route record based on the route key, and provisioning a new route based on the new route record into a routing table of the network device.

Various alternative embodiments additionally include determining whether route learning is enabled for the network device; and performing the steps of constructing, determining, and generating only when route learning is enabled for the network device.

Various alternative embodiments additionally include determining whether the message was routed by at least one intermediate node prior to the network node receiving the message; and performing the steps of constructing, determining, generating, and provisioning only when the message was routed by at least one intermediate node prior to the network node receiving the message.

Various alternative embodiments are described wherein the route key includes a value of an Origin-Realm attribute-value pair (AVP) of the message, a value of an Application-ID field of the message, and value representing a peer device from which the network device received the message.

Various alternative embodiments additionally include determining that a peer device has connected to the network device, wherein the peer device is associated with the new route record; in response to determining that the peer device has connected to the network device, performing the step of provisioning a new route based on the new route record; determining that the peer device has disconnected from the network device; and in response to determining that the peer device has disconnected from the network device, removing the new route from the routing table of the network device.

Various alternative embodiments are described wherein the step of generating a new route record based on the route key includes: assigning a priority to the new route record, wherein the priority assigned to the new route record is higher than a priority of each of a plurality of existing route records that match an application and destination realm of the message.

Various alternative embodiments additionally include receiving an operator-created route from an operator of the network device; and assigning a priority to the operator-created route, wherein the priority is less than a priority of any existing route records that have been automatically created by the network device.

Various alternative embodiments are described wherein, in determining whether the message was routed by at least one intermediate node, the routed message identifier is configured to determine whether the message includes a route-record attribute-value pair (AVP).

Various alternative embodiments are described wherein the record manager is further configured to: identify a plurality of matching records of the plurality of route records, wherein each matching record of the plurality of matching records matches an application and destination realm of the new route record; determine whether an addition of the new route record to the plurality of matching records will cause a count of the plurality of matching records to exceed a predetermined limit; and if the addition of the new route record to the plurality of matching records will cause the count of the plurality of matching records to exceed the predetermined limit, remove an oldest record of the plurality of matching records from the route configuration storage.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
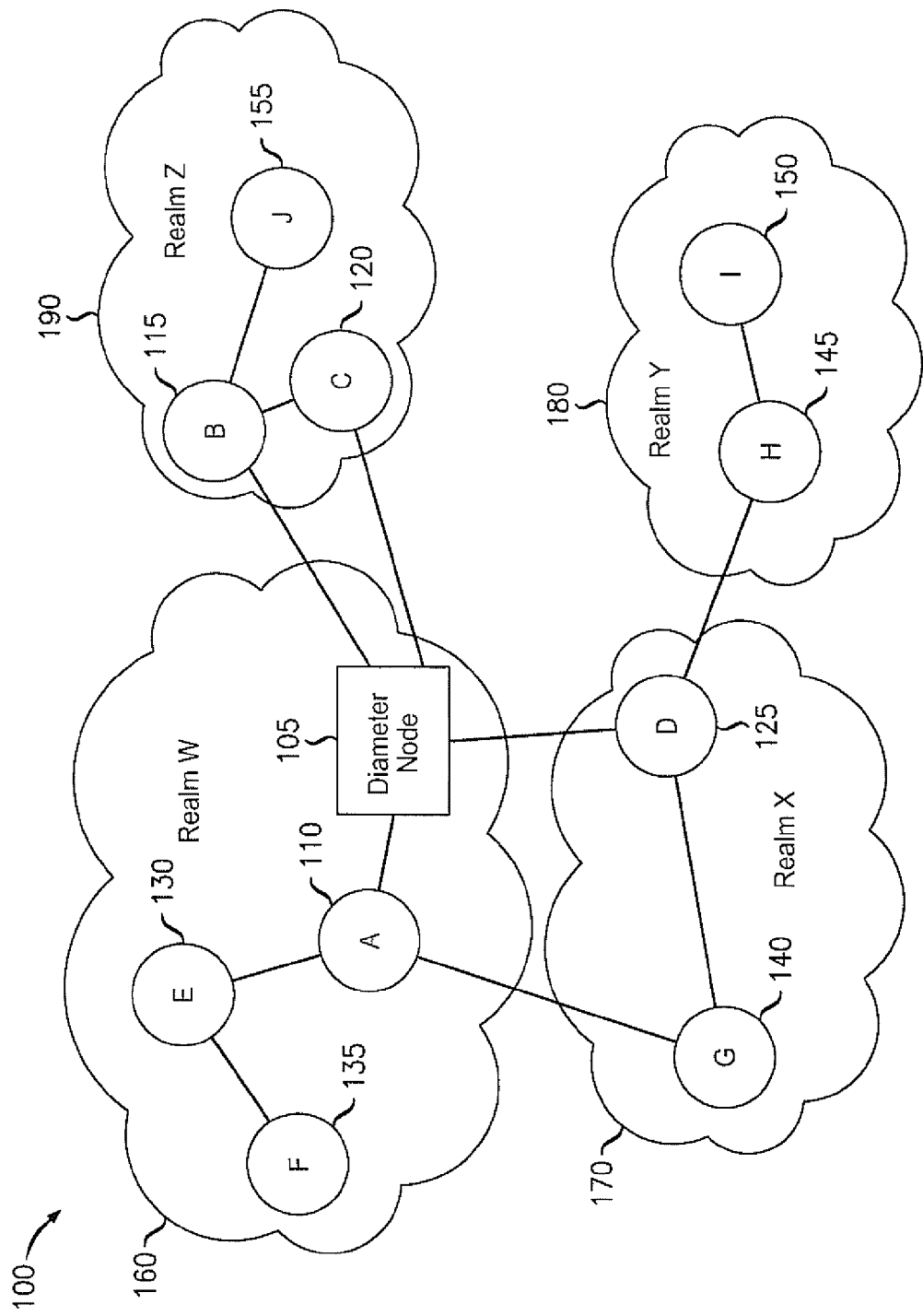
FIG. 1 illustrates an exemplary network for learning Diameter routes.

The Diameter protocol is one example of a protocol that may be implemented to route messages to a destination using a "next hop" routing table. For example, a message that is to be forwarded or otherwise sent to a particular recipient may be forwarded to a "next hop" device depending on the realm of the recipient and the application with which the message is associated. In order for such routing to function, however, there should be some method of constructing the routing table in the first place. Further, due to the dynamic nature of many networks, it may also be useful to continually update the routing table.

Accordingly, there is a need for a method and system capable of creating and maintaining a routing table for a Diameter or other network device. In particular, it would be desirable to provide a method and system that dynamically learn and provision various routes for use in forwarding messages toward their destination.

Referring now to the drawings, in which like numerals refer to like components or steps, there are disclosed broad aspects of various exemplary embodiments.

FIG. 1 illustrates an exemplary network 100 for learning Diameter routes. Exemplary network 100 may include the Internet, a carrier network, and/or any other type of network. Exemplary network 100 may include numerous additional devices (not shown), including additional devices providing connectivity between the devices illustrated. For example, one or more layer 2 and/or layer 3 devices may provide connectivity between Diameter node 105 and peer device 110.

Exemplary network 100 may include Diameter node 105. Diameter node 105 may be any device capable of communicating with other devices according to the Diameter protocol. More specifically, in various exemplary embodiments, Diameter node 105 may be a server, blade, router, personal or laptop computer, wireless email device, cell phone, tablet, television set-top box, or any other device capable of communicating with other devices.

Diameter node 105 may be directly connected to one or more peer devices A-D 110-125. As noted above, this direct connection may include one or more additional devices. The peer devices A-D 110-125 may be considered to be directly connected to Diameter node 105 because Diameter node 105 may transmit a message to any of these peer devices A-D 110-125 without the message being forwarded by an intermediate Diameter device. In other words, each of the peer devices A-D 110-125 may be a "next hop" device for Diameter node 105.

Exemplary network 100 may also include a number of additional devices E-J 130-155 that are not directly connected to Diameter node. Instead, devices E-J 130-155 may be in communication with Diameter node 105 via one or more intermediate nodes such as, for example, one of peer devices A-D 110-125. For example, device F 135 may be in communication with Diameter node 105 via two intermediate nodes: device E 130 and device A 110.

Collectively, devices A-J 110-155 may each communicate according to the Diameter protocol and may each be a server, blade, router, personal or laptop computer, wireless email device, cell phone, tablet, television set-top box, or any other device capable of communicating with other devices. Each device A-J 110-155 may perform a different function within a Diameter network. For example, device F 135 may be a charging system that charges for use of network 100, while devices G 140 and 1150 may both be packet data network gateways that provide gateway access to another network (not shown). Various additional types of devices that may communicate according to the Diameter protocol will be apparent to those of skill in the art.

Each device 105-155 of exemplary network 100 may belong to a realm. As illustrated, diameter node 105, device A 110, device E 130, and device F 135 may belong to realm W 160; device D 125 and device G 140 may belong to realm X 170; device H 145 and device I 150 may belong to realm Y 180; and device B 115, device C 120, and device J 155 may belong to realm Z 190. When sending a message to another device A-J 110-155, Diameter node 105 may direct the message to a next hop based, at least partially, on the realm of the destination device. For example, rather than maintaining independent routing table entries for both device H 145 and device I 150, Diameter node 105 may include entries that indicate that messages destined for realm Y 180 should be forwarded to peer device D 125 as a next hop. Device D 125 may, in turn, forward the messages to device H 145. Once the message has entered realm Y 180, the devices therein 145-150 may route the message based on the actual host to which the message is addressed.

Diameter node 105 may also route Diameter messages based on the application with which the messages are associated. For example, Diameter node 105 may route a message destined for device G 140 to either peer device A 110 or peer device D 125, depending on the application with which the message is associated. The route through peer device D 125 may be optimal, but peer device A 110 may perform intermediate processing on messages related to a particular video streaming application. Thus, if the packet is associated with the video streaming application, Diameter node 105 may forward the message to peer device A 110, and if the packet is associated with a different application, Diameter node 105 may forward the message to peer device D 125.

Exemplary network 100 may have a dynamic topology. Various devices A-J 110-155 may exit the network or change the devices to which they are connected. For example, device F 135 may go offline, thereby exiting the network, while device J 155 may move such that device J 155 is no longer connected to device B 115 and is instead in direct communication with device I 150. Further, additional devices (not shown) may enter the network. Diameter node 105 may be adapted to determine when peer devices, such as peer devices A-D 110-125, have connected or disconnected from Diameter node 105. For example, upon connecting or disconnecting from Diameter node 105, a peer device may send an announcement message to Diameter node 105. Alternatively or additionally, Diameter node 105 may poll peer devices to ensure continued connectivity and/or may monitor messages received from peer devices to make inferences as to which peer devices remain in direct communication with Diameter node 105. Various additional methods for determining whether a peer device has connected to or disconnected from Diameter node 105 will be apparent to those of skill in the art.

Figure 2:
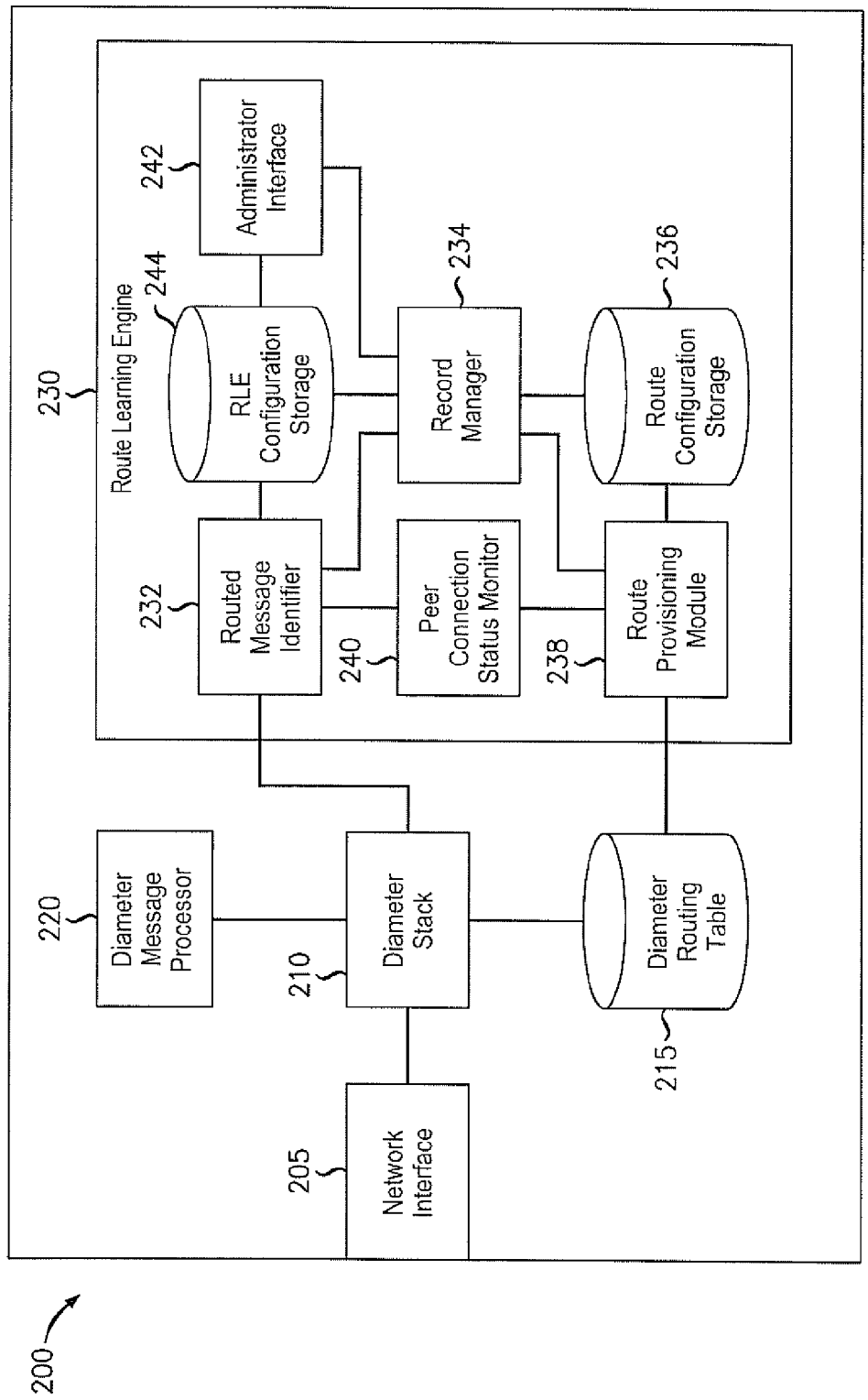
FIG. 2 illustrates an exemplary network node for learning Diameter routes.

FIG. 2 illustrates an exemplary network node 200 for learning Diameter routes. Exemplary node 200 may correspond to Diameter node 105 of exemplary network 100. In various embodiments, exemplary node 200 may additionally correspond to one or more of devices A-J 110-155. Exemplary node 200 may include a network interface 205, Diameter stack 210, Diameter routing table 215, Diameter message processor 220, and route learning engine 230.

Network interface 205 may be an interface comprising hardware and/or executable instructions encoded on a machine-readable storage medium configured to communicate with at least one other device. In various embodiments, network interface 205 may include one or more Ethernet interfaces. During operation, network interface 205 may receive and transmit Diameter messages to other devices. Network interface 205 may additionally communicate with other devices according to protocols other than Diameter.

Diameter stack 210 may include hardware and/or executable instructions on a machine-readable storage medium configured to implement Diameter-based communications with other devices. As such, Diameter stack may receive Diameter messages via network interface 205, perform various functions associated with the Diameter protocol, forward the message to a next hop device, and/or pass the message to Diameter message processor for higher-level processing. Diameter stack 210 may also receive outgoing messages from Diameter message processor 220, perform various functions associated with the Diameter protocol, and transmit the message via network interface 205. Such various functions associated with the Diameter protocol may include constructing new messages according to the protocol, validating the syntax of a message, associating a message with a previously sent or received message, and/or forwarding a message to an appropriate next hop device. Diameter stack 210 may perform various additional Diameter protocol-related functions as will be apparent to those of skill in the art.

When forwarding messages to a next hop device, Diameter stack 210 may utilize data stored in Diameter routing table 215 to determine the appropriate next hop device for each particular message. Diameter routing table 215 may be any machine-readable medium capable of storing definitions for various Diameter routes. Accordingly, Diameter routing table 215 may include a machine-readable storage medium such as read-only memory (ROM), random-access memory (RAM), magnetic disk storage media, optical storage media, flash-memory devices, and/or similar storage media. In various embodiments, Diameter routing table 215 may store a number of route definitions that include information such as the application and destination realm pair for which a route definition applies and an identity of a next hop device for each route definition. Route definitions may further include "wildcard" characters and priority values, as will be described in greater detail below with respect to FIG. 4. When transmitting a diameter message, Diameter stack may locate a highest priority route definition that matches the outgoing message in Diameter routing table 215 and subsequently forward the message to the next hop device identified by the located route definition.

Diameter message processor 220 may include hardware and/or executable instructions on a machine-readable storage medium configured to implement various high-level functions in association with Diameter applications. For example, Diameter message processor may implement a charging function that imposes charges on various users based on charging reports received from other devices. As another example, Diameter message processor may implement a policy and charging rules function, as described by the Third Generation Partnership Project (3GPP) Technical Specifications (TS) 29.212-14. Various additional functions performed by Diameter message processor 220 will be apparent to those of skill in the art.

Route learning engine (RLE) 230 may include hardware and/or executable instructions on a machine-readable storage medium configured to process received messages to learn new routes for various applications to various realms. As such, route learning engine 230 may receive various messages from diameter stack 210 or another component of exemplary network node 200. Route learning engine 230 may include a number of subcomponents such as routed message identifier 232, record manager 234, route configuration storage 236, route provisioning module 238, peer connection status monitor 240, administrator interface 242, and/or RLE configuration storage 244.

Routed message identifier 232 may include hardware and/ or executable instructions on a machine-readable storage medium configured to determine whether a message has been routed by an intermediate node prior to being received by exemplary network node 200. In various embodiments, route learning engine 230 may only learn new routes from messages that have been routed by at least one intermediate node. This is because, in such embodiments, exemplary network node 200 may already be aware of the peer devices that are directly connected. In such embodiments, messages received from a directly connected peer device may reveal no further information as to how to route future messages. In other words, in such embodiments, any message destined for a peer device may simply be routed directly to that peer device. Messages that have been routed, on the other hand, may reveal a new realm that may be reached for a particular application via a peer node.

Routed message identifier 232 may employ various methods for determining whether a received message has been previously routed. For example, according to various implementations of the Diameter protocol, a Route-Record attribute value pair (AVP) may be added to a message by the first device to route the message and may be modified by each subsequent device to route the message. As such, routed message identifier may determine that a message has been previously routed if the message contains a Route-Record AVP. Alternatively or additionally, the message may include an Origin-Host AVP that indicates the device that originally sent the message. Routed message identifier 232 may compare the value of the Origin-Host AVP to the identity of the peer device from which the network node received the message. If the peer device does not match the Origin-Host AVP, routed message identifier 232 may determine that the message has been routed by at least one other device. Various additional methods of determining whether a received message has been previously routed by at least one intermediate node may be apparent to those of skill in the art. If the message has been routed, routed message identifier 232 may forward the message to record manager 234 for further processing.

Record manager 234 may include hardware and/or executable instructions on a machine-readable storage medium configured to generate new route records based on received routed messages and/or administrator instructions. For example, upon receiving a routed message from routed message identifier 232, record manager may generate a "route key" based on one or more values carried by the message. As used herein, the term "route key" may refer to a set of information that at least partially describes a potential route for forwarding messages. In various embodiments, the route key may include the set of information necessary for defining a particular route. In one example, the route key may include a 3-tuple including values for a destination realm, application id, and next hop device. Thus, in this example, the 3-tuple may identify a peer device to which messages of the particular application type destined for the particular realm should be forwarded. Record manager may construct this 3-tuple by extracting a value from an Origin-Realm AVP of the message for the destination realm, extracting a value from an Application-ID field of the message for the application id, and noting the peer device from which the message was received for the next hop device.

After constructing a route key from the message, record manager 234 may search route configuration storage 236 to determine whether the route was already known. Route configuration storage 236 may be any machine-readable medium capable of storing records for various potential Diameter routes. Accordingly, route configuration storage 236 may include a machine-readable storage medium such as read-only memory (ROM), random-access memory (RAM), magnetic disk storage media, optical storage media, flash-memory devices, and/or similar storage media. In various embodiments, route configuration storage 236 may include the same physical device as Diameter routing table 215. As will be described in greater detail below with respect to FIG. 4, each route record stored in route configuration storage 236 may include a route key similar to the route key constructed by record manager 234. Record manager 234 may search route configuration storage 236 to determine whether any previous route record includes the same route key constructed from the received message. If a route record including the route key already exists in route configuration storage 236, the route may already be known and the message may be ignored by record manager. Otherwise, if the route key is not included in any route record, the route may be newly discovered. In response, record manager 234 may proceed to construct a new route record from the received message and/or route key and subsequently store the new route record in route configuration storage 236 for possible future provisioning into Diameter routing table 215. Record manager may include additional information in the new route records such as, for example, a time stamp and/or priority value, as will be described in greater detail below with respect to FIG. 4.

Route provisioning module 238 may include hardware and/or executable instructions on a machine-readable storage medium configured to provision various routes into Diameter routing table 215 based on the contents of route configuration storage 236. In response to signals received from various other components, such as record manager 234 and/or peer connection status monitor 240, route provisioning module 238 may select one or more records from route configurations storage 236 that are appropriate for provisioning. For example, if record manager 234 indicates that a new route record has been created, route provisioning module 238 may locate the record and determine whether it should be provisioned based on various factors such as the priority of the new route record and/or the priorities of other route records that are currently provisioned in Diameter routing table or are otherwise active. As another example, peer connection status monitor may indicate that a peer device has connected to network node 100. In response, route provisioning module may locate any route records in route configuration storage that include the peer device as a next hop and determine whether any such routes should be provisioned. Various additional or alternative methods of determining which routes to provision into Diameter routing table 215 will be apparent to those of skill in the art. After identifying a route record to be provisioned, route provisioning module 238 may extract from the route record any information that will be used by Diameter stack 210 and stores the information as a new entry in Diameter routing table 215.

Route provisioning module 238 may also be configured to remove provisioned routes from Diameter routing table 215. For example, when provisioning a new route which overrides an already-provisioned route, route provisioning module 238 may remove the entry for the already-provisioned route from Diameter routing table 215. In various embodiments, the new route may override the already-provisioned route when the new route matches the same destination realm and application but has a higher priority than the already provisioned routes. In various alternative embodiments, Diameter stack 210 may allow two or more overlapping entries to exist in Diameter routing table as backup routes.

Peer connection status monitor 240 may include hardware and/or executable instructions on a machine-readable storage medium configured to determine whether each peer device known to the network device 200 is currently connected to or disconnected from the network device 200. For example, peer connection status monitor 240 may receive incoming messages from routed message identifier 232, Diameter stack 210, or another component of network device 200 and determine whether a peer is currently connected or disconnected from the network device 200. For example, peer connection status monitor 240 may identify various messages as announce a connection or disconnection, or may infer from activity or lack thereof the connection status of a peer. Peer connection status monitor 240 may alternatively or additionally be configured to communicate with peer devices to poll the connection status of those peer devices. Various additional methods of monitoring connection statuses of peer devices will be apparent to those of skill in the art. Upon determining that a peer device has connected or disconnected, peer connection status monitor 240 may send an appropriate indication to route provisioning module 238. Route provisioning module 238 may then provision new routes and/or remove previously provisioned routes from Diameter routing table 215 in view of the connections and disconnections.

Administrator interface 242 may include hardware and/or executable instructions on a machine-readable storage medium configured to enable network device interaction with an administrator or other operator. As such, administrator interface may include a network interface, monitor, mouse, and/or keyboard for enabling human interaction. Using administrator interface 242, an operator may be able to communicate with record manager 234 to thereby manually create new route records. Such "operator-created" routes may be assigned a priority lower than that of any "learned" routes.

An operator may also be able to use administrator interface 242 to customize various operating parameters of route learning engine 242, as stored in RLE configuration storage 244. RLE configuration storage 244 may be any machine-readable medium capable of storing operating parameters for RLE 230. Accordingly, RLE configuration storage 244 may include a machine-readable storage medium such as read-only memory (ROM), random-access memory (RAM), magnetic disk storage media, optical storage media, flash-memory devices, and/or similar storage media. In various embodiments, RLE configuration storage 244 may include the same physical device as Diameter routing table 215 and/or route configuration storage 236.

For example, an operator may be disable or enable route learning via administrator interface 242, thereby updating an indication of whether route learning is enabled stored in RLE configuration storage 244. This indication may be used by other subcomponents, such as routed message identifier 232 and/or record manager 234, to toggle the operation of various functions. For example, if route learning is disabled in RLE configuration storage 244, routed message identifier 232 may not analyze any messages received by Diameter stack 210, thereby disabling the automatic learning of new routes. Further, upon switching route learning from enabled to disabled, route provisioning module 238 may proceed to remove any learned routes from diameter routing table 215.

As another example, RLE configuration storage 244 may store a configurable maximum number of routes per type of message. Record manager 234, upon creating a new route record, may count the number of existing records that match the destination realm and application of the new route record. If the addition of the new route record would cause this count to exceed the maximum number of records per type of message, the record manager 234 may remove a record from route configuration storage 236 and indicate to route provisioning module that any corresponding entries in Diameter routing table 215 should also be removed. Record manager 234 may choose a route record to delete, for example, by determining the oldest timestamp among the matching records.

As yet another example, RLE configuration storage 244 may store an indication of whether newer learned routes should take priority over older learned routes. If so, when creating a new route record, record manager 234 may ensure that the new record includes a highest priority among the route records matching the destination realm and application of the new route record. Otherwise, record manager 234 may assign a priority based on different factors or may assign the same priority as all other learned route records.

Figure 3:
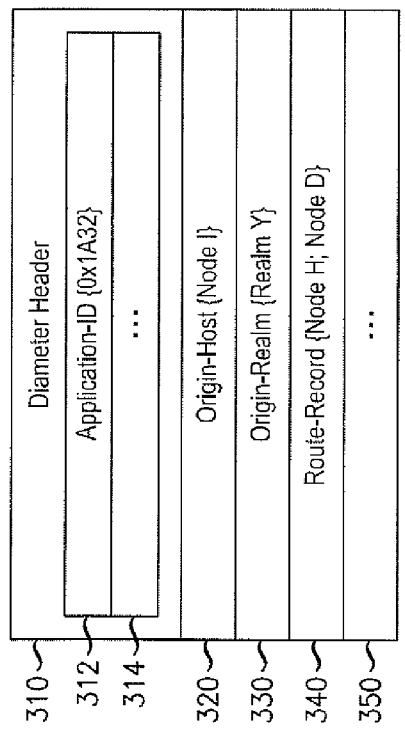
FIG. 3 illustrates an exemplary Diameter message.

FIG. 3 illustrates an exemplary Diameter message 300. Diameter message 300 may be formed according to the Diameter protocol and may be received by a network node such as, for example, Diameter node 105 of exemplary network 100. In this example, Diameter node 105 may receive message 300 from peer device D 125. Diameter message 300 may carry a number of values that reveal further information regarding the purpose of the message and the route taken by the message to arrive at Diameter node 105.

Diameter message 300 may include a Diameter header 310 constructed according to the Diameter protocol. As such, Diameter header 310 may include an Application-ID field 312. In this example, Application-ID field may indicate that Diameter message 300 is associated with the application identified as 0x1A32. Diameter header 310 may include numerous additional fields 314.

Diameter message 300 may include a number of attribute-value pairs (AVPs) 320-350. Origin-Host AVP 320 may indicate, in this example, that the message was originally sent by device I 150. Further, Origin-Realm AVP 330 may indicate that the message 300 originated from Realm Y 180. Finally, Route-Record AVP 340 may indicate that the message 300 was routed by two intermediate nodes, device H 145 and device D 125, prior to being received by Diameter node 105. Diameter message 300 may include numerous additional AVPs 350. According to the values carried by message 300, Diameter node 105 may infer, among other things, that Realm. Y 180 may be reached via peer device D 125. Thus, in the future, Diameter node 105 may route messages destined for Realm Y 180 and associated with Application ID 0x1A32 to peer device D 125.

Figure 4:
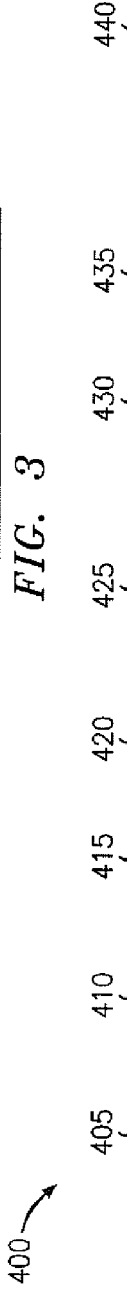
FIG. 4 illustrates an exemplary data arrangement for storing route records.

FIG. 4 illustrates an exemplary data arrangement 400 for storing route records. Data arrangement 400 may be, for example, a group of tables in a database stored in route configuration storage 236. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include a number of fields 405-440 that hold values useful in defining a route and/or route record. In various embodiments, data arrangement 400 may include additional or alternative fields (not shown). Destination realm field 405 may store an indication of a destination realm to which a route record applies. Application field 410 may store an indication of an application to which a route record applies. Peer origin host field 415 may store an indication of a peer device to serve as a next hop device for the route record. Together, destination realm field 405, application field 410, and peer origin host field 415 may define a route key for each record, as described above with regard to FIG. 2.

Priority field 420 may define a relative priority for each route record. The value of priority field 420 may be used to determine which routes should be provisioned for use by a Diameter stack and/or which provisioned route a Diameter stack should attempt to use for a particular message first. Operator-created flag field 425 may store an indication of whether each route record was manually created by an operator or, alternatively, automatically learned by a route learning engine. In various embodiments, learned routes may always take priority over operator-created routes. In such embodiments, certain priority values may be reserved specifically for learned route records. For example, learned routes may be given a priority of 1 or 2 while operator-created route records may be given a priority of 3 or 4.

Timestamp field 430 may store a timestamp that indicates when each route record was created. Active flag field 435 may store an indication of whether a route is currently provisioned for use by a Diameter stack. Description field 440 may store a text string provided by an operator to describe a particular route. In various embodiments, operators may be unable to modify the values of the various fields of route records that were learned by a route learning engine. In some such embodiments, operators may nonetheless be able to modify the value of description field 440 for such learned route records.

Various route records may include "wildcard" values. For example, route record 465 includes a value of "*" as a destination realm while route record 470 includes a value of "*" as an application. In such a case, any value carried by a message may match the wildcard value. Thus, a message destined for Realm W and associated with application 0x1A32 may match route record 470 because route record 470 includes a destination realm of Realm W and an application of "*".

As an example, route record 450 indicates that for messages related to application 0x1A32 and destined for realm X, a Diameter stack in which a matching route is provisioned may forward the message to peer device D. Route record 450 may have a priority of "1" and may have been automatically learned at time "1320531207." Further, route record 450 may not be currently provisioned to a Diameter stack and may not be associated with any descriptive text. Data arrangement 400 includes additional exemplary route records 455-470, the meaning of which will be apparent to those of skill in the art in view of the foregoing. Data arrangement 400 may include numerous additional route records 475.

Figure 5:
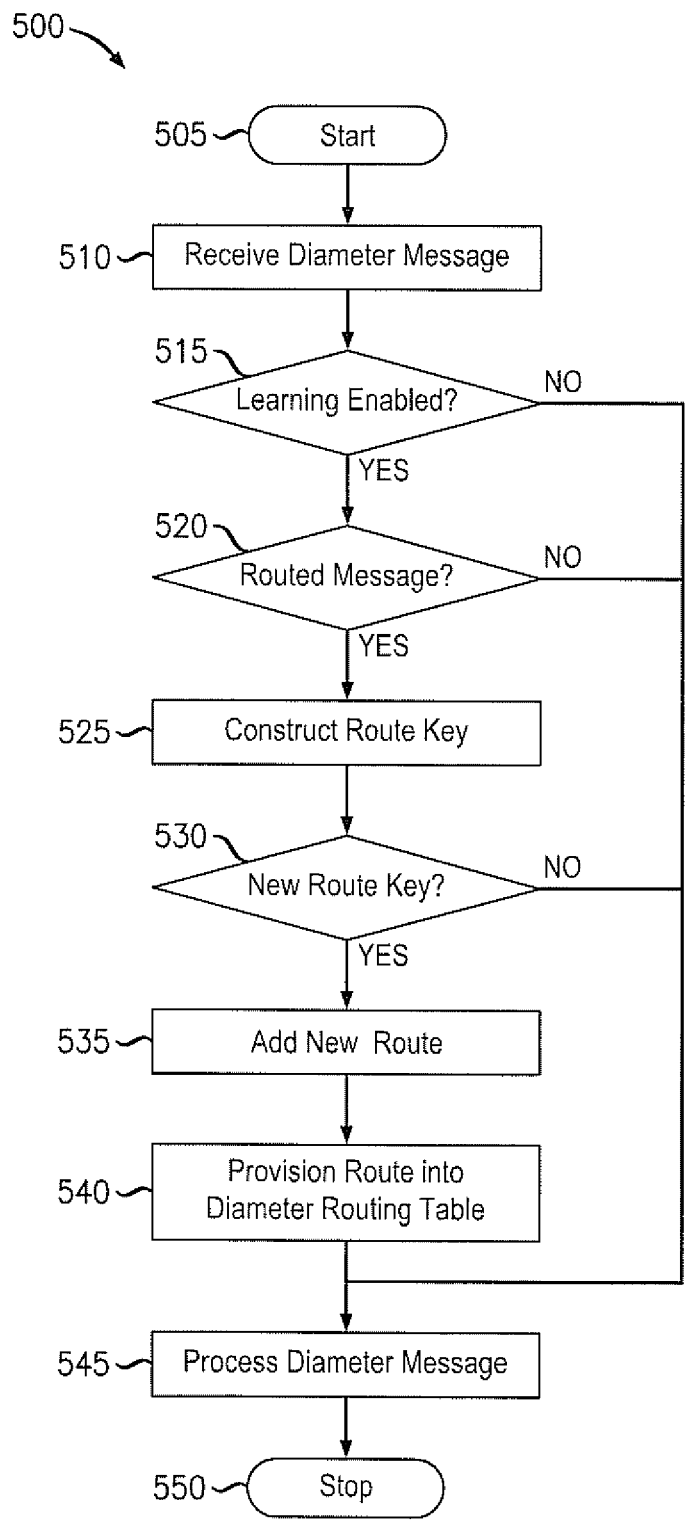
FIG. 5 illustrates an exemplary method for learning Diameter routes.

FIG. 5 illustrates an exemplary method 500 for learning Diameter routes. Method 500 may be performed by the components of network device 200 such as, for example, network interface 205, Diameter stack 210, Diameter message processor 220, routed message identifier 232, record manager 234, and/or route provisioning module 238.

Method 500 may begin in step 505 and proceed to step 510 where network device 200 may receive a Diameter message from a peer device. Next, in step 515, network device 200 may determine, whether route learning has been enabled for network device 200. If route learning is not enabled, method 500 may proceed directly to step 545. Otherwise, method 500 may proceed to step 520 where network device 200 may determine whether the received message has been routed by at least one intermediate node. For example, network device 200 may determine whether the message carries a Route-Record AVP or may compare a value of a Origin-Host AVP to the peer device from which the message was received. If the message was not routed, method 500 may proceed directly to step 545. Otherwise, method 500 may proceed to step 525.

In step 525, network device 200 may construct a route key, as previously explained. For example, network device may construct a 3-tuple including the origin realm and application id from the message and the identity of the peer device from which the message was received. Next, in step 530, network device 200 may determine whether this route key is new to the network device 200. For example, network device 200 may search a plurality of route records to determine if any active route record already includes the route key. If network device 200 locates an active route record that includes the route key, method 500 may proceed directly to step 545. Otherwise, network device 200 may, in step 535, add the new route to the plurality of route records. This step may include creating a new route record, assigning values such as a priority and timestamp, and storing the new route record for future use.

Next, in step 540, network device 200 may provision the new route in routing table 215 for use by Diameter stack 210. It will be appreciated that, in various alternative embodiments, the new route may not be provisioned at this time. For example, in embodiments wherein only one route matching a particular message type may be provisioned at a time, if another route with a higher priority that matches the same message type is currently provisioned, network device 200 may refrain from provisioning the new route. Various additional or alternative scenarios wherein a new route is not immediately provisioned will be apparent to those of skill in the art. In various embodiments, method 500 may include various additional steps (not shown) prior to moving on to step 545. For example, in various embodiments, network device 200 may determine whether the new route has caused network device 200 to exceed a predetermined limit on the number of routes that match the key in the routing table. If so, network device 200 may unprovision an older route from the routing table. Further, if the older route was a learned route, network device 200 may also delete the corresponding route configuration.

Method 500 may then proceed to step 545 where network device 200 may perform additional processing on the Diameter message. This may include higher-level processing such as charging a user or establishing service flows for a user upon request. Method 500 may then proceed to end in step 550.

It will be apparent to the person of ordinary skill in the art that method 500 is presented as an example of one possible method and that various modifications may be performed. For example, various operations may be performed in parallel. In one such embodiment, step 545 may be performed parallel to steps 515-540. Various additional modifications may be apparent to those of skill in the art.

It should also be noted that while the examples described herein are directed to implementations of the Diameter protocol, the methods and systems described may be applicable to learning routes associated with alternative protocols as well. Various modifications for implementing the methods and systems described herein to operate in conjunction with alternative protocols will be apparent to those of skill in the art.

Having described the detailed operation of various exemplary embodiments, an example of the operation of some such embodiments will now be described. For the purposes of example, network device 200 may correspond to Diameter node 105 and data arrangement 400 may indicate the contents of route configuration storage 236.

The process may begin when network device receives message 300 from peer device D 125 via network interface 205. Diameter stack 210 may then process the message according to the Diameter protocol. After determining in step 515 that RLE configuration storage 244 stores an indication that learning is enabled, routed message identifier 232 may identify message 300 as a routed message in step 520 because message 300 include Route-Record AVP 340. Record manager 234 may then construct a 3-tuple route key of <Realm Y, 0x1A32, Node D> from the message 300 and determine that data arrangement does not store any route record 450-475 including this route key in steps 525 and 530, respectively. Record manager 234 may then create a new route record based on the 3-tuple in step 535. Record manager 234 may also determine that RLE configuration storage 244 stores an indication that new routes should be given a highest priority. Subsequently, record manager 234 may assign a priority of "1" to the new record and ensure that any other route records that match the route key include a priority of "2" or lower. Record manager 234 may then store the route record in route configuration storage 236 for future use. Next, in step 549, route provisioning module 238 may read the new route record from route configuration storage 236 and provision a corresponding route in Diameter routing table 215.

Finally, in step 545, Diameter message processor may perform high-level processing of the message. This processing may include constructing and sending a response to the origin host, device I 150. If Diameter node 105 simply acts as a router, Diameter node 105 may forward message 300 based on a different route. Then, as a request from another device is routed back to device I 150, diameter node 105 may transmit the request to peer device D 125 as a next hop, based on the newly learned and provisioned route.

According to the foregoing, various embodiments enable a network device to automatically learn routes to various other network devices. In particular, by examining the origin and other details of messages received at the network device, the network device may infer that the origin may be reached in the future via the same route over which the message arrived. Various additional benefits will be apparent in view of the foregoing.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for learning routes, the method comprising:
    receiving a message at the network device from a peer device;
    constructing a route key based on the message, wherein the route key comprises at least one value carried by the message, and wherein the route key identifies a realm that can be reached via the peer device;
    determining whether the network device stores a previous route record associated with the route key; and
    if the network device does not store a previous route record associated with the route key, generating a new route record based on the route key, comprising assigning a priority to the new route record, wherein the priority assigned to the new route record is higher than a priority of each of a plurality of existing route records that match an application and destination realm of the message and provisioning a new route based on the new route record into a routing table of the network device.

2. The method of claim 1, further comprising:
    determining whether route learning is enabled for the network device; and
    performing the steps of constructing, determining, and generating only when route learning is enabled for the network device.

3. The method of claim 1, further comprising:
    determining whether the message was routed by at least one intermediate node prior to the network node receiving the message; and
    performing the steps of constructing, determining, generating, and provisioning only when the message was routed by at least one intermediate node prior to the network node receiving the message.

4. The method of claim 1, wherein the route key comprises a value of an Origin-Realm attribute-value pair (AVP) of the message, a value of an Application-ID field of the message, and value representing a peer device from which the network device received the message.

5. The method of claim 1, further comprising:
    determining that a peer device has connected to the network device, wherein the peer device is associated with the new route record;
    in response to determining that the peer device has connected to the network device, performing the step of provisioning a new route based on the new route record;
    determining that the peer device has disconnected from the network device; and
    in response to determining that the peer device has disconnected from the network device, removing the new route from the routing table of the network device.

6. The method of claim 1, further comprising:
    receiving an operator-created route from an operator of the network device; and
    assigning a priority to the operator-created route, wherein the priority is less than a priority of any existing route records that have been automatically created by the network device.

7. A network device for learning routes comprising:
    a network interface that receives a message from a peer device;
    a route configuration storage that stores a plurality of route records, each route record including a route key;
    a routing table that defines a plurality of provisioned routes;
    a record manager configured to:
        construct a new route key based on the message, wherein the new route key comprises at least one value carried by the message, and wherein the route key identifies a realm that can be reached via the peer device;
        determine whether any route record of the plurality of route records includes the new route key; and
        if no route record of the plurality of route records includes the new route key, generate a new route record based on the message, comprising assigning a priority to the new route record, wherein the priority assigned to the new route record is higher than a priority of each of a plurality of existing route records that match an application and destination realm of the message; and
    a route provisioning module configured to provision a new route to the routing table based on the new route record.

8. The network device of claim 7, further comprising:
    a route learning engine configuration storage that stores an indication of whether route learning is enabled for the network device,
    wherein, the record manager only generates the new route record when the indication of whether route learning is enabled for the network device indicates that route learning is enabled for the network device.

9. The network device of claim 7, further comprising:
a routed message identifier configured to determine whether the message was routed by at least one intermediate node prior to the network node receiving the message,
wherein the record manager only generates the new route record when the message was routed by at least one intermediate node.

10. The network device of claim 9, wherein, in determining whether the message was routed by at least one intermediate node, the routed message identifier is configured to determine whether the message includes a route-record attribute-value pair (AVP).

11. The network device of claim 7, wherein the route key comprises a value of an Origin-Realm attribute-value pair (AVP) of the message, a value of an Application-ID field of the message, and value representing a peer device from which the network device received the message.

12. The network device of claim 7, wherein the record manager is further configured to:
identify a plurality of matching records of the plurality of route records, wherein each matching record of the plurality of matching records matches an application and destination realm of the new route record;
determine whether an addition of the new route record to the plurality of matching records will cause a count of the plurality of matching records to exceed a predetermined limit; and
if the addition of the new route record to the plurality of matching records will cause the count of the plurality of matching records to exceed the predetermined limit, remove an oldest record of the plurality of matching records from the route configuration storage.

13. A non-transitory machine-readable storage medium encoded with instructions for execution by a network device for learning routes, the non-transitory machine-readable storage medium comprising:
instructions for receiving a message at the network device from a peer device;
instructions for constructing a route key based on the message, wherein the route key comprises at least one value carried by the message, and wherein the route key identifies a realm that can be reached via the peer device;
instructions for determining whether the network device stores a previous route record associated with the route key; and
instructions for, if the network device does not store a previous route record associated with the route key, generating a new route record based on the route key, comprising assigning a priority to the new route record, wherein the priority assigned to the new route record is higher than a priority of each of a plurality of existing route records that match an application and destination realm of the message, and
provisioning a new route based on the new route record into a routing table of the network device.

14. The non-transitory machine-readable storage medium of claim 13, further comprising:
instructions for determining whether route learning is enabled for the network device; and
instructions for executing the instructions for constructing, determining, and generating only when route learning is enabled for the network device.

15. The non-transitory machine-readable storage medium of claim 13, further comprising:
instructions for determining whether the message was routed by at least one intermediate node prior to the network node receiving the message; and
instructions for executing the instructions for constructing, determining, generating, and provisioning only when the message was routed by at least one intermediate node prior to the network node receiving the message.

16. The non-transitory machine-readable storage medium of claim 13, wherein the route key comprises a value of an Origin-Realm attribute-value pair (AVP) of the message, a value of an Application-ID field of the message, and value representing a peer device from which the network device received the message.

17. The non-transitory machine-readable storage medium of claim 13, further comprising:
instructions for determining that a peer device has connected to the network device, wherein the peer device is associated with the new route record;
instructions for, in response to determining that the peer device has connected to the network device, executing the instructions for provisioning a new route based on the new route record;
instructions for determining that the peer device has disconnected from the network device; and
instructions for, in response to determining that the peer device has disconnected from the network device, removing the new route from the routing table of the network device.

18. The non-transitory machine-readable storage medium of claim 13, further comprising:
instructions for receiving an operator-created route from an operator of the network device; and
instructions for assigning a priority to the operator-created route, wherein the priority is less than a priority of any existing route records that have been automatically created by the network device.

* * * * *